(12) United States Patent
Lotem et al.

(10) Patent No.: US 8,239,951 B2
(45) Date of Patent: Aug. 7, 2012

(54) SYSTEM, METHOD AND COMPUTER READABLE MEDIUM FOR EVALUATING A SECURITY CHARACTERISTIC

(75) Inventors: Amnon Lotem, Ramot Hashavim (IL); Gideon Cohen, Palo Alto, CA (US); Ilan Horn, Givat-Ada (IL); Moshe Meiseles, Hod Hasharon (IL)

(73) Assignee: Skybox Security, Inc., San Jose, CA (US)

( * ) Notice: Subject to any disclaimer, the term of this patent is extended or adjusted under 35 U.S.C. 154(b) by 932 days.

(21) Appl. No.: 11/420,588

(22) Filed: May 26, 2006

(65) Prior Publication Data

US 2006/0218640 A1 Sep. 28, 2006

Related U.S. Application Data

(63) Continuation-in-part of application No. 10/262,648, filed on Oct. 1, 2002, now Pat. No. 6,952,779.

(51) Int. Cl.
*G06F 21/00* (2006.01)
(52) U.S. Cl. ............... 726/25; 703/2; 703/13; 709/220; 709/249; 714/37
(58) Field of Classification Search .................... 726/25, 726/26
See application file for complete search history.

(56) References Cited

U.S. PATENT DOCUMENTS

| | | | |
|---|---|---|---|
| 6,088,804 A * | 7/2000 | Hill et al. | 726/25 |
| 6,324,656 B1 * | 11/2001 | Gleichauf et al. | 714/37 |
| 6,546,493 B1 * | 4/2003 | Magdych et al. | 726/25 |
| 7,016,980 B1 * | 3/2006 | Mayer et al. | 709/249 |
| 7,055,107 B1 * | 5/2006 | Rappaport et al. | 715/848 |
| 7,058,821 B1 * | 6/2006 | Parekh et al. | 713/194 |
| 7,222,366 B2 * | 5/2007 | Bruton et al. | 726/23 |
| 7,325,252 B2 * | 1/2008 | Bunker et al. | 726/25 |
| 7,342,893 B2 * | 3/2008 | Barkai et al. | 370/245 |
| 7,664,845 B2 * | 2/2010 | Kurtz et al. | 709/224 |
| 7,673,043 B2 * | 3/2010 | Keir et al. | 709/224 |
| 7,765,283 B2 * | 7/2010 | Noy et al. | 709/220 |
| 2003/0009696 A1 * | 1/2003 | Bunker et al. | 713/201 |
| 2003/0051049 A1 * | 3/2003 | Noy et al. | 709/238 |
| 2003/0195861 A1 * | 10/2003 | McClure et al. | 707/1 |
| 2008/0052054 A1 * | 2/2008 | Beverina et al. | 703/6 |
| 2009/0016244 A1 * | 1/2009 | Sharma et al. | 370/307 |

OTHER PUBLICATIONS

Modeling and characterizing parallel computing performance on heterogeneous networks of workstations|URL: http://ieeexplore.ieee.org/stamp/stamp.jsp?tp=&arnumber=530661|Xiaodong Zhang|Yong Yan|1995 IEEE.*
Distributed scan model for Enterprise-Wide Network Vulnerability Assessment|URL: http://www.sans.org/reading_room/whitepapers/auditing/distributed-scan-model-enterprise-wide-network-vulnerability-assessment_74| SANS Institute InfoSec Reading Room|2002.*

* cited by examiner

*Primary Examiner* — Thanhnga B Truong
*Assistant Examiner* — Mahfuzur Rahman
(74) *Attorney, Agent, or Firm* — Reches Patents

(57) ABSTRACT

A method, system and computer program product for evaluating an IDP entity, the method includes evaluating an effect of at least one IDP rule applied by the IDP entity on legitimate traffic, based upon a network model; evaluating an effect of at least one IDP rule applied by the IDP entity based upon a network model and an attack model; determining an effectiveness of the IDP entity in response to the evaluated effects.

40 Claims, 7 Drawing Sheets

SYSTEM, METHOD AND COMPUTER READABLE MEDIUM FOR EVALUATING A SECURITY CHARACTERISTIC

RELATED INVENTIONS

This patent application is a continuation in part of U.S. patent application Ser. No. 10/262,648 filed Oct. 1, 2002 now U.S. Pat. No. 6,952,779.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

System, method and computer readable medium for evaluating a security characteristic.

BACKGROUND OF THE INVENTION

Computer networks are plagued with vulnerabilities. Vulnerabilities are weaknesses in computers and devices caused, for example, by bugs or misconfigurations. Attackers attack computer networks by exploiting vulnerabilities, frequently causing damages such as denial of service and theft of corporate secrets. Attackers often exploit several vulnerabilities in a row starting with one device, attacking several devices along the way, and ending at the final target device. Attackers may start attacks from the Internet, an intranet, or any other network.

Consequently, security assessments are performed by, for example, security staff. Typically, security assessments are manual labor intensive processes performed several times per year in various forms such as security audits, penetration testing, and certification & accreditation.

For various reasons, security assessments have become very complex. For example, large networks may have a great many vulnerabilities. In addition, network environments may change extremely frequently, and new vulnerabilities are discovered almost every day. In order to determine the business impact of vulnerabilities, each vulnerability must be examined in both a network and a business context. The impact of a given vulnerability can vary depending on where the vulnerability is found. Furthermore, accuracy of an assessment is compromised when new changes in the network or applications are made. Yesterday's assessment may become obsolete in a day due to the dynamic nature of present day IT environments. All of these factors can have a dramatic negative effect on the efficiency, accuracy, and timeliness of security assessments. Moreover, security incidents are on the rise.

Various detection or assessment devices, such as scanners, can be of use in helping to detect vulnerabilities at a component level, but such devices do not address or incorporate business or IT context considerations. As such, they cannot, for example, provide an overall security "big picture," they cannot help security staff to understand the business impact of any given vulnerability, and they do not enable accurate prioritization of vulnerabilities on a real time or almost real time basis.

A number of references discuss systems and methods to assist security staff in performing security assessments. For example, U.S. Pat. No. 6,324,656, entitled, "System and Method for Rules-Driven Multi-Phase Network Vulnerability Assessment," by Gleichauf et al. discusses a method for performing pinging and port scans of devices on a network to detect vulnerabilities. Gleichauf et al., however, among other shortcomings, limits its methods to pinging and port scanning and does not integrate its scanning methods with other information such as access control lists and business rules.

A January 1998 Sandia National Laboratories report entitled, "A Graph-Based Network-Vulnerability Analysis System," by Swiler et al. discusses a graph-based approach to network vulnerability analysis. The system requires as input a database of common attacks, broken into atomic steps, specific network configuration and topology information, and an attacker profile. The attack information is matched with topology information and an attacker profile to create a superset attack graph. Nodes identify a step of attack and arcs represent attacks or steps of attacks. By assigning probabilities of success on the arcs or costs representing level-of-effort for the attacker, various graph algorithms such as shortest-path algorithms can identify the attack paths with the highest probability of success. Swiler et al., however, among other shortcomings, uses an inefficient algorithm that is not practical for use in actual field situations having many network nodes and possible attacks that could be launched by an attacker, and does not generate corresponding fixes to eliminate the threats posed by the vulnerabilities.

Today, security assessment is still a manual, labor-intensive process that requires a security savvy person to perform. Due to its manual fashion, the security assessment process as a whole is a snapshot-oriented process that requires large amounts of time to conduct and cannot be performed continuously.

During the scanning phase of vulnerability assessments, a large number of assessed atomic vulnerabilities are generally found. Herein, the term "atomic vulnerability" generally includes vulnerabilities associated with a network node. Immediately fixing all vulnerabilities is not a viable solution due to time and resource constraints. Further, vulnerabilities are not static and new vulnerabilities are often discovered on subsequent scans due to changing network topologies and new vulnerabilities being published. Security staff thus must frequently choose which vulnerabilities to fix. Making this choice in production networks is extremely difficult since halting and changing a production network often requires proof of actual risk of damage to the organization's business, rather than a mere presence of a technical vulnerability.

There is thus a need for systems and methods to conduct security assessments automatically in a computer network.

SUMMARY OF THE INVENTION

Generally, the present invention satisfies these needs and provides a method, a system and a computer readable medium for evaluating a security characteristic.

Conveniently, a method is provided. The method includes (a) generating a network model representative of a topology of a network and of vulnerabilities of network nodes; (b) generating an attack dictionary representative of attack actions on at least one network node; (c) determining access and Intrusion Detection and Prevention (IDP) information representative of possible communication paths through the network and of IDP rules applied during the possible communication paths; (d) evaluating at least one first result of at least one attack on at least one network node; (e) altering at least one IDP parameter and repeating steps (a)-(c); (f) evaluating at least one second result of at least one attack on at least one network node; and (g) evaluating a security characteristic in response to the at least one first result and the at least one second result. Conveniently, after a single sequence of stages (a)-(c) an evaluation of the security characteristic is done. Thus, the repetition of stages (a)-(c) and the alteration of at least one IDP parameter is optional.

Conveniently, a method is provided. The method includes: evaluating an effect of at least one IDP rule applied by the IDP entity on legitimate (non-malicious) traffic, based upon a network model; evaluating an effect of at least one IDP rule applied by the IDP entity based upon a network model and an attack model; determining an effectiveness of the IDP entity in response to the evaluated effects.

Conveniently, a method is provided. The method includes: performing access and IDP analysis such as to identify remote services that can be accessed from at least one source; examining, for the identified remote services, related attacking actions that belong to a selected group of attack actions and identifying the IDP rules which are applied to the packets sent to the identified remote services.

Conveniently, a computer program product is provided. The computer program product includes a computer usable medium including a computer readable program, wherein the computer readable program when executed on a computer causes the computer to (a) generate a network model representative of a topology of a network and of vulnerabilities of network nodes; (b) generate an attack dictionary representative of attack actions on at least one network node; (c) determine access and IDP information representative of possible communication paths through the network and of IDP rules applied during the possible communication paths; (d) evaluate at least one first result of at least one attack on at least one network node; (e) alter at least one IDP parameter and repeat (a)-(c); (f) evaluate at least one second result of at least one attack on at least one network node; and (g) evaluate a security characteristic in response to the at least one first result and the at least one second result.

Conveniently, a computer program product is provided. The computer program product includes a computer usable medium including a computer readable program, wherein the computer readable program when executed on a computer causes the computer to evaluate an effect of at least one IDP rule applied by the IDP entity on legitimate traffic, based upon a network model; evaluate an effect of at least one IDP rule applied by the IDP entity based upon a network model and an attack model; and to determine an effectiveness of the IDP entity in response to the evaluated effects.

Conveniently, a computer program product is provided. The computer program product includes a computer usable medium including a computer readable program, wherein the computer readable program when executed on a computer causes the computer to perform access and IDP analysis such as to identify remote services that can be accessed from at least one source; examine, for the identified remote services, related attacking actions that belong to a selected group of attack actions and identify the IDP rules which are applied to the packets sent to the identified remote services.

Conveniently, a system is provided. The system includes a computer that is adapted to (a) generate a network model representative of a topology of a network and of vulnerabilities of network nodes; (b) generate an attack dictionary representative of attack actions on at least one network node; (c) determine access and IDP information representative of possible communication paths through the network and of IDP rules applied during the possible communication paths; (d) evaluate at least one first result of at least one attack on at least one network node; (e) alter at least one IDP parameter and repeat (a)-(c); evaluate at least one second result of at least one attack on at least one network node; and (g) evaluate a security characteristic in response to the at least one first result and the at least one second result.

Conveniently, a system is provided. The system includes a computer that is adapted to evaluate an effect of at least one IDP rule applied by the IDP entity on legitimate traffic, based upon a network model; evaluate an effect of at least one IDP rule applied by the IDP entity based upon a network model and an attack model; and to determine an effectiveness of the IDP entity in response to the evaluated effects.

Conveniently, a system is provided. The system includes a computer that is adapted to perform access and IDP analysis such as to identify remote services that can be accessed from at least one source; examine, for the identified remote services, related attacking actions that belong to a selected group of attack actions and identify the IDP rules which are applied to the packets sent to the identified remote services.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE DRAWINGS

Figure 1:
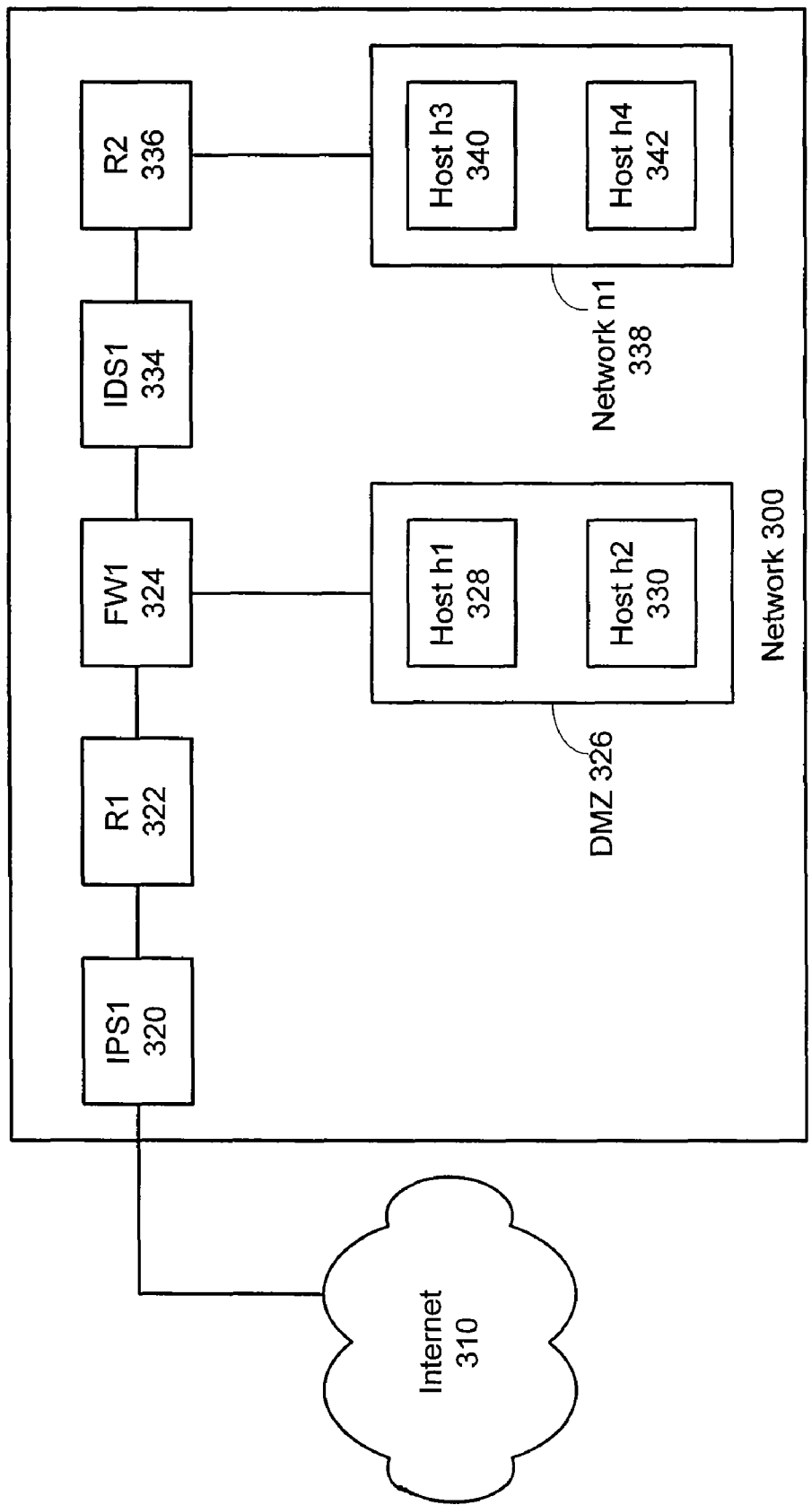
FIG. 1 illustrates a network that includes multiple intrusion detection and prevention (IDP) entities, according to an embodiment of the invention.

Preferred embodiments of methods, systems, and computer programs according to the invention are described through reference to the Figures.

The following are examples and illustrations relating to terms used herein, and are not intended to be limiting of the scope of such terms.

The term, "network," as used herein, whether itself or in association with other terms, generally includes or refers to not only a network as a whole, but also any components or aspects thereof, such as network nodes, groups of network nodes, or components or aspects of network nodes, as well as services, applications, hardware, hardware components, software, software components, and the like, associated with the network or any component or aspect thereof, as well as any associated configurations.

The term, "network service," and similar terms, as used herein, generally includes any software, software components, applications, operating systems, and the like, associated with the network, its nodes, or any other component or aspect of the network, as well as associated configurations, including service configurations, and including services that can be activated from or in association with network nodes.

The term, "network information," and similar terms, as used herein, generally includes a variety of types of information relating to the network or any components or aspects thereof, such as network nodes, and includes configurations of or associated with computers, software, software components, applications, operating systems, and the like, including network services information and network topology information. The term "network vulnerability," as used herein, generally includes vulnerabilities such as any kind of IT vulnerabilities, including vulnerabilities at various levels, such as at a network level, an application level, a host level, or a user level.

The term "IDP entity" and similar terms, as used herein generally includes intrusion detection entities, intrusion prevention entities, intrusion detection and prevention entities, firewalls, routers, and load-balancers with IDP ability, "all in one" devices, which include IDP abilities, and worm protecting systems wherein an entity can include at least one software component, at least one hardware component, at least one middleware component or a combination thereof.

The term "signature" and similar terms, as used herein generally includes various checks (or rules) which IDP entities can perform (or apply), such as searching for a known attack pattern within a communication packet, looking for some kind of anomaly: protocol anomaly, or behavioral anomaly (e.g., port scan or denial of service attack), looking for worm propagation patterns, identifying access to a forbidden URL, pinpointing buffer overflow, etc.

A security characteristic can relate to a network, one or more network nodes and an IDP entity. It can represent a security level of the network, a security level associated with certain attacks, network vulnerabilities, vulnerabilities of one or more network nodes, the effectiveness of an IDP entity, one or more IDP rules applied by one or more IDP entities, the location of one or more IDP entity and the like.

A security level can relate to various metrics such as the risk (monetary or qualitative scale) that attacks can cause to network nodes and/or business assets, taking in account the potential damage and its likelihood. The security level can relate also to the number and severity of vulnerabilities which their exploitation is possible (exposed), or to the number and severity of violations of a security policy defined for the network. The term might also relate to other in-use security metrics An IDP parameter can include any security characteristic associated with an IDP entity. For example it can include the location of the IDP entity, one or more IDP rules applied by the IDP entity and the like.

The following drawings are illustrated in view of an evaluation of an effectiveness of an IDP entity. It is noted that it can be applied mutatis mutandis for evaluating other security characteristics such as but not limited to a security level of a network, network vulnerability and the like.

According to an embodiment of the invention a system, method and computer readable medium are provided. The effectiveness of an IDP entity can be evaluated by utilizing a network model, an attack dictionary and a model of the evaluated IDP entity. It is noted that multiple IDP entities can be evaluated concurrently.

Conveniently, the network can include many IDP entities, but this is not necessarily so. Conveniently, the effectiveness of an IDP entity is evaluated by comparing the affect of at least one attack on a first network that includes the evaluated IDP entity and on a second network that does not include the evaluated IDP entity.

Conveniently, the method can include selecting a location for one or more IDP entities, by comparing the result of one or more attacks on networks that represent different locations of the one or more IDP entities.

It is noted that the methods can be applied in order to evaluate whether to add one or more IDP entities to a network, whether to upgrade one or more existing IDP entities, whether to change the configuration of one or more IDP device, whether to replace one or more IDP entities and the like.

According to an embodiment of the invention the location of one or more IDP entities as well as the rules applied by the IDP devices can be evaluated by comparing the result of one or more attack on the different network configurations and different IDP entity configurations.

According to various embodiments of the invention the effectiveness of an IDP entity can be responsive to the manner in which the IDP device manages attacks, to the manner in which the IDP device manages non-malicious (legitimate) traffic or to a combination thereof.

Conveniently, the effectiveness of an IDP entity can be evaluated in response to all possible attacks, selected possible attacks, or to predefined security requirements (such as monitoring or preventing certain type of events). It is noted that the effectiveness of the IDP entity can be responsive to the probability of one or more attack, to the detection probability of the one or more attack, the accuracy of detecting the one or more attack, to the prevention probability of the one or more attack and to a combination thereof.

Conveniently, the effectiveness of the IDP entity can be evaluated in response to various parameters including whether the attack reaches the IDP entity, the relevancy of the IDP rules applied by the evaluated IDP entity on the attack, and the like.

According to an embodiment of the invention a network model is used to determine which attacks attempts propagate through IDP entities and the IDP entity model is used to evaluate the IDP rules applied (if any) against the attack attempt. The IDP entity model is also used to evaluate the expected results of the applied IDP rules on the attack attempt. Conveniently, the effectiveness of the IDP entity can be evaluated in response the risk imposed to business assets as a result of the possible network attacks Conveniently, the network model represents the network topology and its devices that may include routers, firewalls, load balancers, IDP entities, and the like. U.S. Pat. No. 6,952,779 of Cohen et al., which is incorporated herein by reference illustrates a system, method and computer readable medium that can generate a network model, find the possible multi step attacks on the network model, and associate risks with target nodes. A network topology can include the identity of the network nodes and the connectivity between them, as well as network nodes characteristics including vulnerabilities.

Conveniently, various types of IDP entities can be evaluated. These IDP entities can include, for example, network-based intrusion prevention systems (NIPS), host-based intrusion prevention systems (HIPS), intrusion detection systems (IDS), Application intrusion prevention systems, Database intrusion prevention systems, firewalls, routers, hybrid switches, load-balancers, and "all in one" devices with IDP ability, and worm protecting systems.

FIG. 1 illustrates network 300 that includes IDP entities 320, 324, 334 and 340, according to an embodiment of the invention.

Network 300 includes a first IDP entity (IPS1) 320 that is a layer two standalone network based IPS device, a second IDP entity (FW1) 324 that is a firewall with IPS abilities, a third IDP entity (IDS1) 334 that is a layer three standalone IDP entity and a fourth IDP entity (h3) 340 that is a host on which a host based IPS software is installed.

Network 300 also includes first router (R1) 322, second router (R2) 336, host h1 328, host h2 330 and host h4 342. Hosts h1 and h2 form DMZ network 326 that is connected to FW1 324. Hosts h3 and h4 form network n1 338 that is connected to second router R2 336.

IPS1 320 is connected between internet 310 and first router R1 322. FW1 is connected between R1 322, IDS1 334 and DMZ 326. R2 336 is connected between IDS1 334 and n1 338. IDS1 334 can detect malicious communication between FW1 324 and R2 336.

Host h1 328 is characterized by vulnerabilities v1 and v2. Host h2 330 is characterized by vulnerabilities v1, v2 and v3. Host h3 340 is characterized by vulnerabilities v4 and v5. Host h4 342 is characterized by vulnerability v6.

An attack model can take into account several parameters, including, for example, the source and target of the communication, and optionally some details on the attacker and the attacking methods (exploiting specific vulnerability, propagation of a specified worm, DDOS attack, etc.). The attack model can be generated as illustrated in previous figures.

Referring, for example, to FIG. 1, network 300 can be used to evaluate if a hacker that accesses network 300 from internet 310 can attack DMZ 326, whether such an attack will be detected (and/or prevented) by at least one IDP entities IPS1 320 or FW1 324, whether a certain worm from DMZ 326 can attack hosts h3 340 and h2 342 of network n1 338, what is the confidence level of any detection and/or prevention step taken by any IDP entity, the likelihood of false positives (interrupting or otherwise preventing non-malicious traffic), whether the attack is not prevented or detected but has to pass through a IDP entity, and the like. For example, the check of attacks on DMZ 326 from Internet 310, might determine that attacks are possible, but will be detected by the IDP equipment with a high confidence. The check of worm attacks on h3 from the DMZ might determine that the attack is prevented by an IPS device with a high confidence.

Conveniently, the result of checking an attacking action might also include access explanation—an access route or set of access routes from the source to the target that are used for performing the attacking action. Each access route lists the sequence of network devices along the route, including the IDP entities and the rules which were applied by them. For example, the explanation for the possibility to attack h2 from the Internet by exploiting vulnerability v3, might present the following access route: Internet, IPS1 (rule 1—Detect), R1, FW1 (ACL rule 7—Allow), R2, h2.

Figure 2:
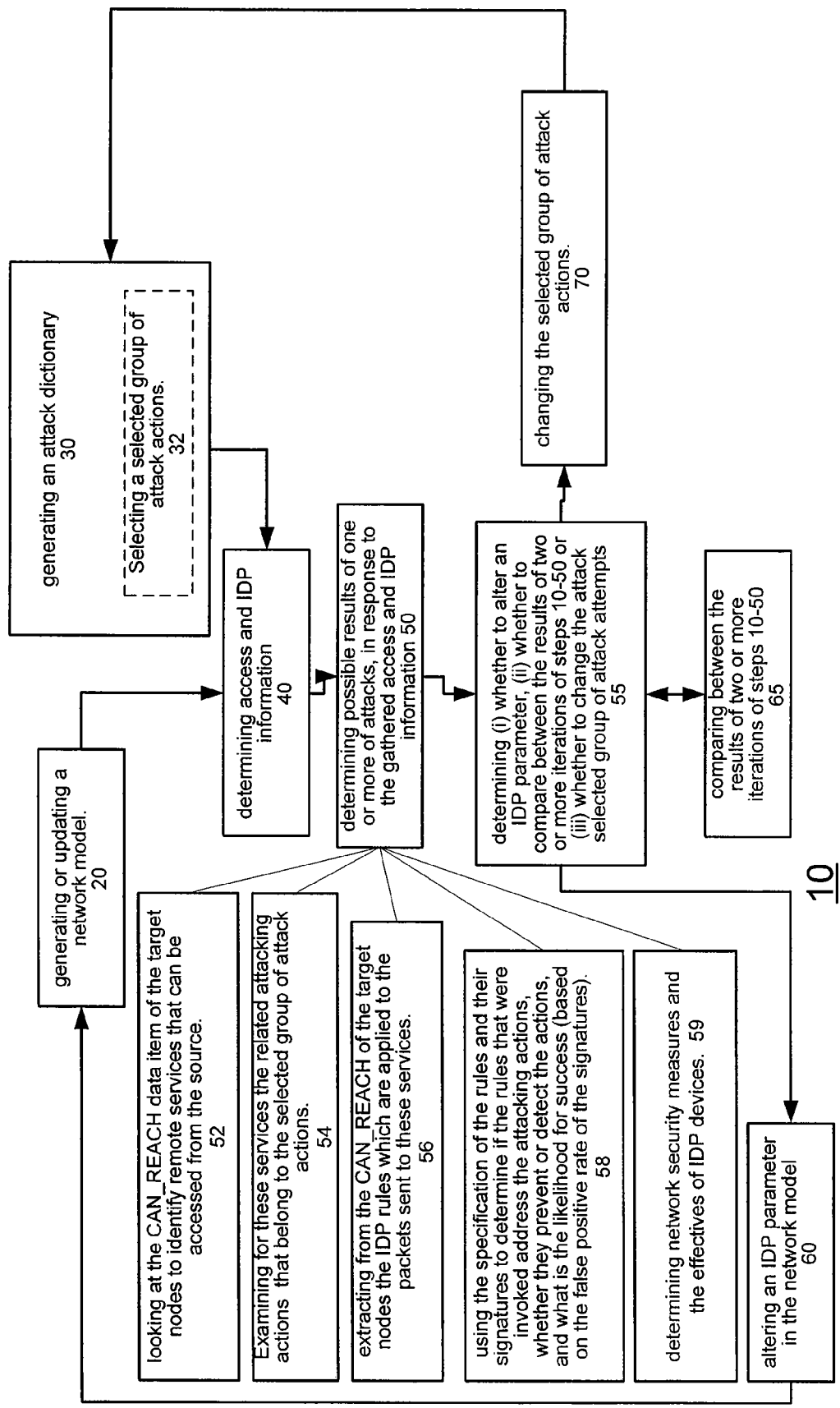
FIG. 2 illustrates a method for evaluating an IDP entity in accordance with embodiments of the present invention.

FIG. 2 illustrates method 10 for evaluating an IDP entity in accordance with embodiments of the present invention.

It is noted that the stages of method 10 can be used to improve the effectiveness of one or more IDP entities, and/or to improve the security level of a network or a portion of the network.

Method 10 starts by steps 20 and 30. Step 20 includes generating or updating a network model. Step 30 includes generating a model (dictionary) of attack actions.

The network model that is generated during step 20 can represent the network configurations, the various access constraints within the network, the network devices vulnerabilities and the capabilities of the IDP entities that are included in the network. The capabilities can include the IDP rules applied by the IDP entities, the connectivity of the IDP entities and the like.

A computerized media that is used for holding the model use software entities for representing nodes, network interfaces of nodes, networks, services (applications) installed on nodes, vulnerabilities which exist on services of nodes. Table 1 specifies data items which might be held in the model for these entities.

It is noted that the network model can represent a real network or a real network with proposed modifications that have to be evaluated The network model can also be associated with information on business assets, and the expected damage to these assets in case of security loss (such as loss that results from confidentiality, integrity and availability breaches).

TABLE 1

| Entity | Data items (partial list) |
| --- | --- |
| Node | Primary IP address (for layer 3 nodes)<br>Name in the network<br>Type (e.g., desktop, server, router, firewall, IPS, IDS)<br>List of network interfaces<br>List of services (applications) installed on the node<br>Routing table (mainly for network devices)<br>Access lists (for routers, firewalls, and nodes with local firewall)<br>IPS/IDS rules of the node |
| Network interface | IP address<br>Name<br>Type<br>Status (up/down) |
| Network | IP address and mask<br>Name<br>Type<br>List of member network interfaces (of nodes)| |
| Service (application) | Name<br>Vendor<br>Version<br>Ports which are used for remote access<br>Vulnerabilities of the service<br>Status (up/down) |
| Vulnerability instance | Catalog ID (such as CVE number)<br>Reference to a description and model of the vulnerability |

The representation of the IDP rules of a network node might include the following information: (i) the scope of the rule (source and target addresses, source and target ports, source and target interfaces). (ii) A reference to an IDP signature that has to be checked. The signature themselves are represented in the signatures model (the signature dictionary) which can be part of the network model. (iii) The action that is performed upon match of the rule (scope and signature).

Table 2 presents a possible model representation for the IPS rules of IPS1 320 and FW1 324 of network 300 of FIG. 1.

TABLE 2

| Device | # | Source | Target | Target Port | Title | Signature | Action |
| --- | --- | --- | --- | --- | --- | --- | --- |
| IPS1 | 1 | Out interface | In interface | TCP/80 | Abnormal http protocol header | Sig 31 | Detect (log) |
| IPS1 | 2 | Out interface | In interface | TCP/80 | Apache chunked encoding | Sig 12 | Prevent (drop |

TABLE 2-continued

| Device | # | Source | Target | Target Port | Title | Signature | Action |
|---|---|---|---|---|---|---|---|
| | | | | | memory corruption | | session) |
| IPS1 | 3 | Out interface | In interface | TCP/53 | Buffer overflow in BIND 8.2 | Sig 17 | Prevent (drop session) |
| FW1 | 1 | Any | Any | TCP/80 | Apache HTTP request smuggling | Sig 27 | Prevent (drop) |
| FW2 | 2 | Any | 172.10.2 5.4 (h1) | TCP/80 | Apache 2.0 backslash directory traversal | Sig 35 | Prevent (drop) |

The network model can be built and held on a computer server. Computer agents which may be installed in the network or outside of it are used for collating data on the network. That data is then used by the server for building or updating the model.

The data collection and model building process can include: (i) Collecting and importing gateway configurations, (ii) Collecting IDP entity configuration, (iii) Collecting additional information about the network.

The collecting and importing gateway configuration can include: (a) Allowing the collection agents to gather the requested configuration from the gateways (routers, firewalls, load balancers and alike) themselves or from other devices (such as but not limited to a repository or a management device that already holds the configuration of the gateways). (b) Transferring the configuration to the server. (c) Inserting the transferred information (for example by a computer program, by middleware) into the network model. This may include parsing the received configuration information, extracting the relevant configuration (name, primary, IP address network interfaces, routing tables, access lists, etc.) and inserting the relevant configuration information into the model. (c) reconstructing the network topology from the information.

The collecting of IDP configuration can include: (i) Allowing the collection agents to communicate with IPS and IDP entities in the network or with managers of these devices, to get their current configurations: rules which are applied, their scope (source, target, interface), and response action (for detecting or preventing). (b) Transferring the configuration to the server. (c) Inserting the transferred information (for example by a computer program, by middleware) into the network model. This information can cause the network model to be updated by inserting IDP entities to the model, modifying the definitions of the IDP entities, and the like. Conveniently, the network model includes IDP entities that are characterized by IDP rules.

The collecting additional information about the network can include collecting information representative of the network vulnerabilities. This may be implemented by: (a) Using network scanners and vulnerability scanners that scan the nodes in the network (servers, desktops, gateways) and gather information on the nodes such as the services installed on these nodes, and the vulnerabilities which exist on these services. (b) Transferring the scan results to the server. (c) Inserting the transferred information (for example by a computer program, by middleware) into the network model.

Any one of the mentioned above steps can be repeated on a regular basis, according to a predefined pattern, in response to event, in a random manner, in a pseudorandom manner or in a combination thereof.

Conveniently, the network model can be updated by using graphic interfaces, non-graphic interfaces, by inserting code, pseudo code and the like. The update can include adding new network nodes, deleting network nodes, or changing the configuration or setup of existing network nodes.

Step 20 includes generating a model (dictionary) of IDP signatures. The term signature is used here as a general term for all kind of checks which IDP entities can perform. Signatures are referenced by IDP rules which appear in the configurations (policies) of IDP entities in the network model.

This modeling of a signature includes: (i) The association between the signature and the attacking actions it can address. The association can be performed explicitly (specifying the attacking actions) or implicitly based on a matching between technical characteristics of the signature and properties of the attacking action. (ii) Measures for the signature that specify its expected false-positive and false-negative rates.

The information for associating signatures with attacking actions and for setting measures for the signatures might be supplied by IDP vendors or by research groups that examine IDP entities. For signatures defined by users of IDP entities, the association might be performed by the users who defined the signatures.

The dictionary of signatures might be held in a repository. These signatures can form a part of the network model, as illustrate din FIG. 2.

Conveniently, the dictionary of signatures is independent of the network model. In a system which implements the method it can be prepared centrally and distributed to all clients who work with system.

Step 30 includes generating an attack dictionary. An attack dictionary can include possible attack actions. The dictionary represents attacking actions such as: Vulnerability exploitation, General hacking actions (e.g., port scan, brute force, file transfer, DDOS attack, backdoor activity), and Worm attacking actions and propagation methods.

Modeling an attacking action in the dictionary is done by specifying for the action information such as: (i) The preconditions and effects for applying the action, (ii) The vulnerabilities which are exploited (if any), (iii) Worms which can perform the action (if any), (iv) The services, ports, and protocols which should be used for the attack, (v) Technical characteristics of exploitation the action, (vi) Estimated difficulty, and (vii) Time considerations.

For example, the potential exploitation of a vulnerability on the Apache web application might be represented in the dictionary as follows: Type: Vulnerability exploitation, Vulnerability: "Apache Chunked-Encoding Memory Corruption Vulnerability" (CVE-2002-0392), Service: Apache, Precondition: Remote access to a vulnerable Apache service using http protocol, Effects: Denial of service or arbitrary code execution, and Difficulty: easy.

The dictionary of attacking actions might be held in a repository with entries for known vulnerabilities, known worms, and general hacking actions.

The dictionary of attacking action is independent of the network model. In a system which implements the method it can be prepared centrally and distributed to all clients who work with system.

Step 30 may also include step 32 of selecting a group of attack actions out of the dictionary to provide a selected group of attack actions. This selected group of attach steps can be used to evaluate the effectiveness of an IDP entity, the security level of the network and the like. The selection can be changed during an evaluation of a network or an evaluation of an IDP entity.

Table 3 presents an example for the possible content of a signature dictionary (relevant to the network example)

TABLE 3

| Vendor | Signature | Title | Addressed attacking actions | F/P rate | F/N rate |
| --- | --- | --- | --- | --- | --- |
| X | Sig 31 | Abnormal http protocol header | All vulnerability exploits which require the abuse of the http protocol header (in our example, the exploit of v3) | High | Low |
| X | Sig 12 | Apache chunked-encoding memory corruption | Exploit of v1 | Low | Low |
| Y | Sig 35 | Apache 2.0 backslash directory traversal | Exploit of v2 | Low | Low |

Steps 20 and 30 are followed by step 40 of determining access and IDP information. Step 40 includes checking if attacking actions from a source network node to target network node are possible and which IDP entities and rules are used for the protecting the attacking actions.

Step 40 may include step 42 and 44. Step 42 includes checking which target nodes can be accessed from the source nodes, independently of a particular communication pattern or attacking action, and which IDP rules will be applied to the communication. Step 44 includes determining if attacking actions from the source nodes to the target nodes are possible, based on the results of step 42.

Step 42 can include: (i) Receiving the network model, the source of the checked access (might relate to a set or range of nodes), and the target of the checked access (might also relate to a set or range of nodes). (ii) Evaluating the set of target nodes and their ports that can be accessed from the source (independently of a particular communication pattern or attacking action), and the IDP rules that are applied to the communication from the source to the accessible ports of the target nodes.

Figure 3:
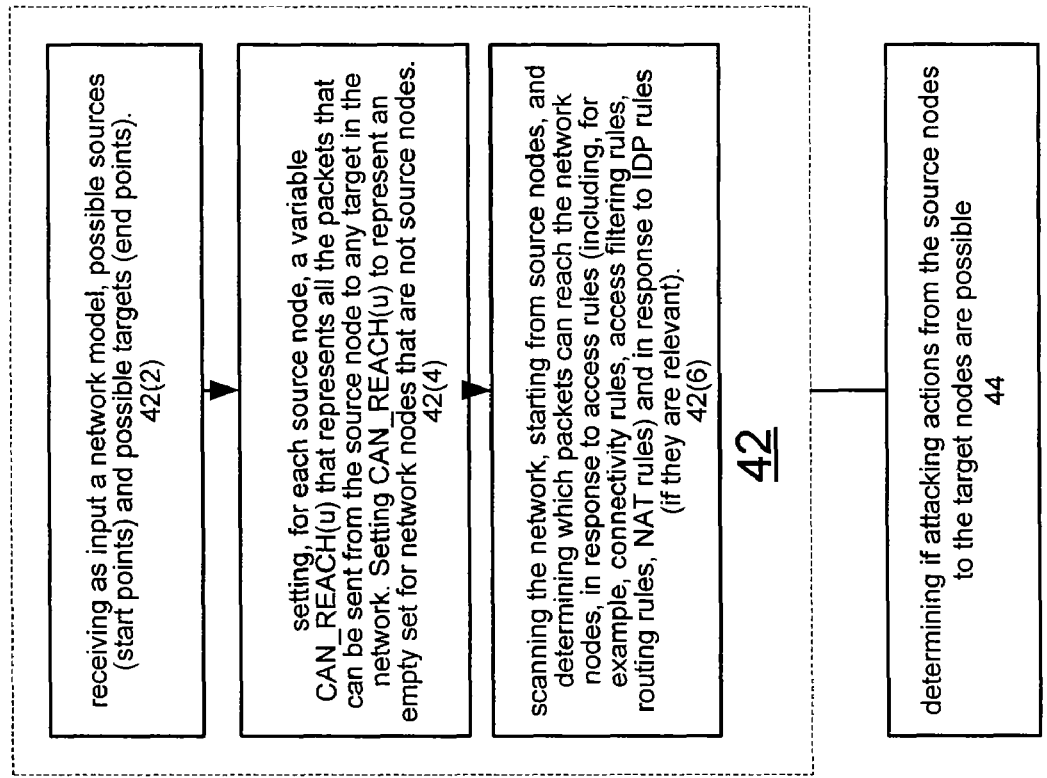
FIG. 3 illustrates two steps of the method for evaluating an IDP entity, according to an embodiment of the invention.

FIG. 3 illustrates step 44 and step 42 of performing access and IDP analysis, according to an embodiment of the invention.

Step 42 includes calculating, for the target network nodes, access and IDP information. For simplicity of explanation this information will be denoted as CAN_REACH. This information includes access information that represents the set of packets that can reach a network node from the source nodes (independently of a particular communication pattern or attacking action), and IDP information representative of the IDP rules which are supposed to be applied to these packers.

Conveniently, a CAN_REACH data item can hold the packets as a set of packet groups, each group might be compactly represented using ranges of IDP rules, IP addresses, ports, and protocols.

Step 42 starts by step 42(2) of receiving as input a network model, possible sources (start points) and possible targets (end points). The different network nodes are represented by an index u. Different network nodes have different u values.

Step 42(2) is followed by step 42(4) of setting, for each source node, a variable CAN_REACH(u) that represents all the packets that can be sent from the source node to any target in the network. Step 42(4) also includes setting CAN_REACH(u) to represent an empty set for network nodes that are not source nodes.

Step 42(4) is followed by step 42(6) of scanning the network model, starting from source nodes, and determining which packets can reach the target network nodes, in response to access constraints (including, for example, the topology of the network, access filtering rules, routing rules, NAT rules) and in response to IDP rules (if they are relevant).

The scanning provides, for each target node, the packets that can reach it from a source nodes and the IDP rules that are applied on these packets.

It is noted that the IDP information can represent the IDP rules that are applied to the packets through the possible paths from the source nodes to the target node but this is not necessarily so.

The following pseudo-code illustrates various steps of step 42, according to an embodiment of the invention:

Input: Network model, source, target
Output:
   1) Target nodes and their ports which are accessible from the source
   2) Applied IDP rules
1. Initialization:
   1.1 For each source node s:
      Set CAN_REACH(s) to represent all the packets that can be sent from s to any target in the network.
      Insert s into TO_BE_HANDLED
   1.2. For each non source node:
      Set CAN_REACH to represent an empty set of packets.
2. While the TO_BE_HANDLED list is not empty:
   2.1. Pick a node n from TO_BE_HANDLED list and remove it from the list
   2.2. For each neighbor n' of n:
      Update CAN_REACH(n') to represent (in addition to previous representation) all packets of CAN_REACH (n) that pass through n and can arrive at n'.
         Consider: access filtering rules and NAT rules of n, and routing rules from n to n'
      Update CAN_REACH(n') with information on IDP rules that their scope matches packets that pass through n and can arrive at n'
      If CAN_REACH(n') was modified, insert n' into TO_BE_HANDLED.
3. For each node n that was specified as a target for the analysis
   3.1. Consider local rules of node n:
      Apply local access rules of n (if any) to CAN_REACH (n)
      Add information on matching local IDP rules of n (if any) to CAN_REACH(n)

3.2. Report on the ports of n which appear as targets in CAN_REACH(n), and on IDP rules that matched packets which can reach to these ports.

Initially the CAN_REACH data item of each source node represents the set of packets that their source is the source node and their target can be any node in the network. The TO_BE_HANDLED list includes the source nodes.

The algorithm computes and updates iteratively the CAN_REACH data item of nodes, starting at immediate neighbors of the source nodes, continuing with neighbors of neighbors and so on until there are no more nodes to be updated (TO_BE_HANDLED is empty).

At each iteration, a node n to be handled is selected, and the CAN_REACH data item of its neighbors is computed. The computation of the CAN_REACH of a neighbor node n' includes the merging (union) of packets already represented in CAN_REACH of n' with packets that can arrive to n' from n. The packets that can arrive from n are computed by: (i) Applying to CAN_REACH of n the access filtering rules and the NAT rules of n, and the routing rules from n to n', and (ii) Updating the representation of these packets with information on IDP rules that their scope (source, target and interface) matched packets transferred from n to n'. For packets that matched no rule, add an indication on passing through the IDP device.

Neighbors which their CAN_REACH data item was updated are added to TO_BE_HANDLED to enable the update of their neighbors.

At the end of the algorithm the CAN_REACH of the target nodes are updated to take in account local rules of the target nodes. Then the CAN_REACH data items of the target nodes are processed to report the ports which are accessible from the source, and the involved IDP rules.

Table 3 represents an example for applying the above algorithm on network 300, whereas the algorithm is applied for checking whether DMZ 326 can be attacked from the Internet 310.

TABLE 4

| Iteration | Current Node (n) | Updated neighbor (n') | CAN_REACH of neighbor n' [Source ->Target, IDP_rules] |
|---|---|---|---|
| Init | | Internet | Any->DMZ, NO_IDP_RULE |
| 1 | Internet | IPS1 | Any->DMZ, NO_IPS_RULE |
| 2 | IPS1 | R1 | Any->DMZ:TCP/80,{IPS1-rule1, IPS1-rule2} Any->DMZ:TCP/53,{IPS1-rule3} Any->DMZ:Not{TCP/80, TCP/53}, Passed through IPS1 |
| 3 | R1 | FW1 | Any->DMZ:TCP/80,{IPS1-rule1, IPS1-rule2}: Any->DMZ:TCP/53,{IPS1-rule3} Any->DMZ :Not{TCP/80, TCP/53}, Passed through IPS1 |
| 4 | FW1 | h1 | Any->h1 TCP/80,{IPS1-rule1, IPS1-rule2, FW1-rule1, FW1-rule2} Any->h1:TCP/53,{IPS1-rule3} Any->h1:Not {TCP/80, TCP/53}, Passed through IPS1, FW1 |
| 4 | FW1 | h2 | Any->h2 TCP/80,{IPS1-rule1, IPS1-rule2, FW1-rule1} Any->h2:TCP/53,{IPS1-rule3} Any->h2:Not {TCP/80, TCP/53}, Passed through IPS1, FW1 |
| 4 | FW1 | R2 | None |

The initialization phase sets the CAN_REACH data item to represent all the packets which can be sent from Internet 310 (any IP address, any source port) to DMZ 326. At this step no IDP rule has been applied yet. The Internet node in the model is inserted into TO_BE_HANDLED.

At the first iteration, Internet 310 is handled and the CAN_REACH of its neighbor IPS1 320 is updated. CAN_REACH of IPS1 320 specifies that any packet sent from Internet 310 to DMZ 326 can reach IPS1 320.

At the second iteration, IPS1 320 is handled and the CAN_REACH of its neighbor R1 322 is updated: any packet to DMZ 326 is directed to R1 322, packets to port TCP/80 and TCP/53 are addressed by IPS rules. This process continues. At the end, the CAN_REACH data item of node h1 328 and node h2 330 expresses which packets can access these hosts, and which IDP rules are supposed to be applied to them in the way.

Step 40 is followed by step 50 of determining possible results of one or more of attacks, in response to the access and IDP information gained during step 40. The results can include prevented attacks, detected attacks, implications of successful attacks and the like.

Step 50 includes simulating attacks that can include multiple attack actions, in response to the access and IDP information. Thus a sequence of attack attempts can be evaluated, starting from a possible source to a possible target, through an available path (as indicated by the access information). If multiple paths exist they can be evaluated. Step 50 may include determining a possibility to perform attack actions between nodes in the network.

Step 50 may include steps 52-59. Step 52 includes looking at the CAN_REACH data item of the target nodes to identify remote services that can be accessed from the source.

Step 52 is followed by step 54 of examining for these services the related attacking actions (e.g., exploitation of vulnerabilities these services have according to the network model) that belong to the selected group of attack actions. Especially, checking if the exploitation preconditions of these attacking actions (as specified in the attacking actions dictionary) are satisfied.

Step 54 is followed by step 56 of extracting from the CAN_REACH of the target nodes the IDP rules which are applied to the packets sent to these services.

Step 56 is followed by step 58 of using the specification of the rules and their signatures to determine if the rules that were invoked address the attacking actions, whether they prevent or detect the actions, and what is the likelihood for success (based on the false positive rate of the signatures).

Referring to network 300, nodes h1 328 and h2 330 of DMZ 326 were found to be accessible from the source (the Internet 310). The exploitation of v1 is prevented for both node h1 328 and node h2 330 by rule 2 of IPS1 320 (Sig 12). The exploitation of v2 is prevented for node h1 328 by IDP rule 2 of FW1 324 (Sig 35) but is not prevented for node h2 330. The exploitation of v3 on node h2 328 is possible but will be detected by rule 1 if IPS1 320 (Sig 31).

Step 50 also includes storing the possible results of one or more of attacks. Step 58 may be followed by a step of storing these results.

Conveniently, step 50 includes step 59 of determining network security measures and the effectives of IDP devices. This network security measures can be determined by applying an attack simulation to a model of the network (for example, in a manner illustrated in U.S. Pat. No. 6,952,779 of Cohen et al., which is incorporated herein by reference). The attack simulation can determine the possible multi step attacks from source nodes on which an attacker might reside to nodes and business assets within the network. The feasibility of each attack step to be added to the reported multi-step attacks is examined using the process described in steps 40 and 50, taking in account the effectiveness of one or more IDP devices. In the network example, the attack simulation can find for example a multi-step attack from the Internet to h4 of network n1. At the first attack step, the attacker takes control on h2 within the DMZ by exploiting v3 (which was found to be non-protected by IPS rules). In the next step, the attacker compromises h4 of network n2 by exploiting vulnerability v6. The attack simulation does not report on an attack on h1 from the Internet as the two vulnerabilities of h1 are protected by IPS rules. The attack simulation first invokes feasibility checks of attacks from the Internet. After finding that the attacker can take control on h2, attack feasibility checks are performed from h2. The attack simulation can include risk calculation which takes computes the probability to succeed in the attacks, and combines it with the expected damage to business assets.

Conveniently, step 50 can include evaluating the effectiveness of one or more IDP entities (and optionally illustrating the effectiveness to the user) in response to various parameters including: (i) coverage rates of security problems (for example, the rate of vulnerabilities or services which are not monitored or prevented by the IDP entity, but are accessible through the device), (ii) lists of security problems which are currently not addressed by the device and could or should be addressed (for example, vulnerabilities which are accessible through the device but are not prevented by its IDP rules).

Conveniently, step 50 can include evaluating the security status (for example risks, risk implications, business impact, vulnerabilities, vulnerabilities implications) of the network.

According to an embodiment of the invention the effect that each attack action out of the selected group of attack actions is evaluated, in response to the access and IDP information.

Conveniently, step 50 may include determining the feasibility of attack actions in response to gathered access and IDP information and determining network security measures and IDP effectiveness.

Step 50 can be followed by query step 55. It is noted that query step 55 is followed by multiple steps, but that it can be followed by other steps, fewer steps or more steps. If query step 55 is followed by fewer steps then query step 55 will include less queries. Query step 55 can be executed automatically, by a human operator and the like.

Query step 55 includes determining whether to alter an IDP parameter (and jump to step 60), whether to compare between the results of two or more iterations of steps 10-50 (and jump to step 65), or whether to change the selected group of attack actions (and jump to step 70).

Step 60 includes altering at least one IDP parameter in the network model and/or in the network itself and jumping to step 20. The IDP parameter can include the location of the IDP entity or a setting of an IDP rule. Step 60 can include adding one or more IDP entity to the model. It is noted that if the network model is responsive to information gathered from the network then changes in the network will be reflected in the network model It is noted that multiple iterations of steps 10-60 can generate multiple results and that by comparing the results the method can determine which IDP parameters provide better (or worse) attack protection and/or attack detection.

For example, the effectiveness of an IDP entity can be evaluated by comparing (during step 65) between the result of one or more possible attacks in a first network that includes the evaluated device and between the result of one or more possible attacks in a second network that differs from the first network by not including the evaluated device.

Step 70 includes changing the selected group of attack actions or otherwise changing the attack dictionary.

Step 70 is followed by step 30. This change can enable to evaluate the effectiveness of one or more IDP entities in response to certain possible attacks.

It is noted that step 65 can be followed by step 55, as the output of the comparison can assist in determining whether to alter an IDP characteristic.

Figure 4:
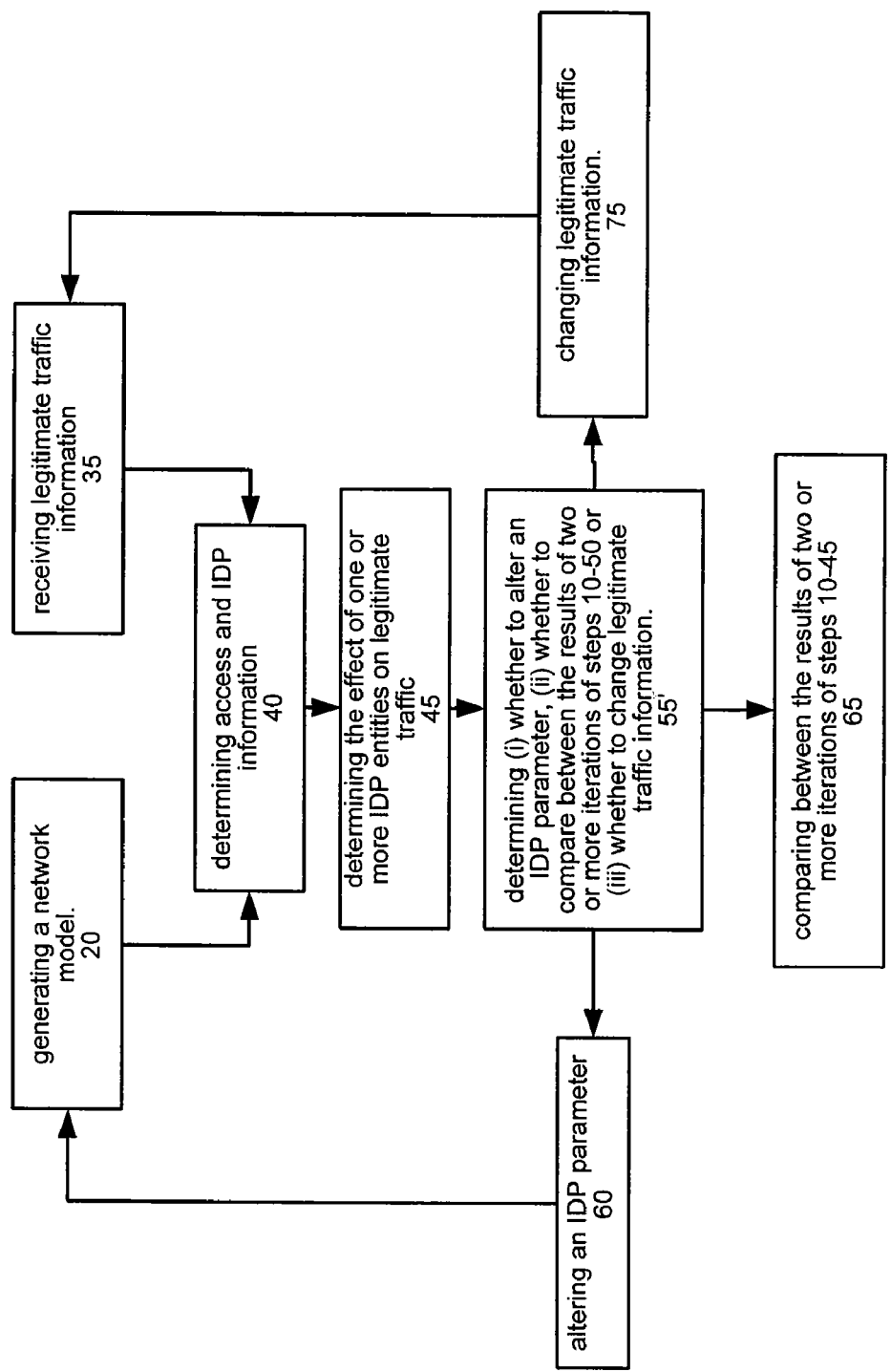
FIG. 4 illustrates a method for evaluating the effectiveness of an IDP entity according to another embodiment of the invention.

FIG. 4 illustrates method 11 for evaluating one or more IDP entities according to another embodiment of the invention.

IDP entities might identify mistakenly non-malicious (legitimate) communication as malicious and block it, thus causing undesired damages to the required connection between clients and services. A method for identifying such risks is based on the following principles: The network model is augmented with information on required communication between clients and services, and the importance of that communication. For example, the home banking web server at the DMZ should be accessible from the Internet using http protocol (critical).

The feasibility check of attacking action is performed for each required communication between client and service. During that check the IDP prevention Rules which are applied to the communication (if it is malicious) are gathered. If the signatures of some of these rules have a significant likelihood for false-positive, the availability of the required communication is at risk, and the situation is reported to the user. The level of the risk depends on the false-positive rate of the signatures and the criticality of the communication.

Method 11 differs from method 10 by including steps 35, 45 and 75 while not including steps 30, 50 and 70.

Method 11 starts by step 20 of generating a network model and step 35 of receiving legitimate traffic information. Steps 20 and 35 are followed by step 40 of determining access and IDP information. Whereas step 40 includes the manner in which legitimate traffic passes through the network) and the IDP information represents which IDP rules are applied on the legitimate traffic.

Step 40 is followed by step 45 of determining the effect of one or more IDP entities on legitimate traffic, in response to the access and IDP information gained during step 40. Step 45 can include receiving information representative of the legitimate traffic, as well as information representing a penalty that is incurred if the legitimate traffic is stopped.

Step 45 is followed by query step 55' of determining whether to alter an IDP parameter (and jump to step 60), whether to compare between the results of two or more iterations of steps 10-40 (and jump to step 65), or whether to change legitimate traffic information (and jump to step 75).

Step 75 includes altering at least one legitimate traffic parameter and jumping to step 20.

Those of skill in the art will appreciate that method 10 and 11 can be combined. Thus, the effectiveness of an IDP entity can be evaluated in response to one or more possible attacks it can prevent and/or detect (whereas this is responsive to the result of these one or more attacks) and in response to the manner is treats legitimate traffic.

Figure 7:
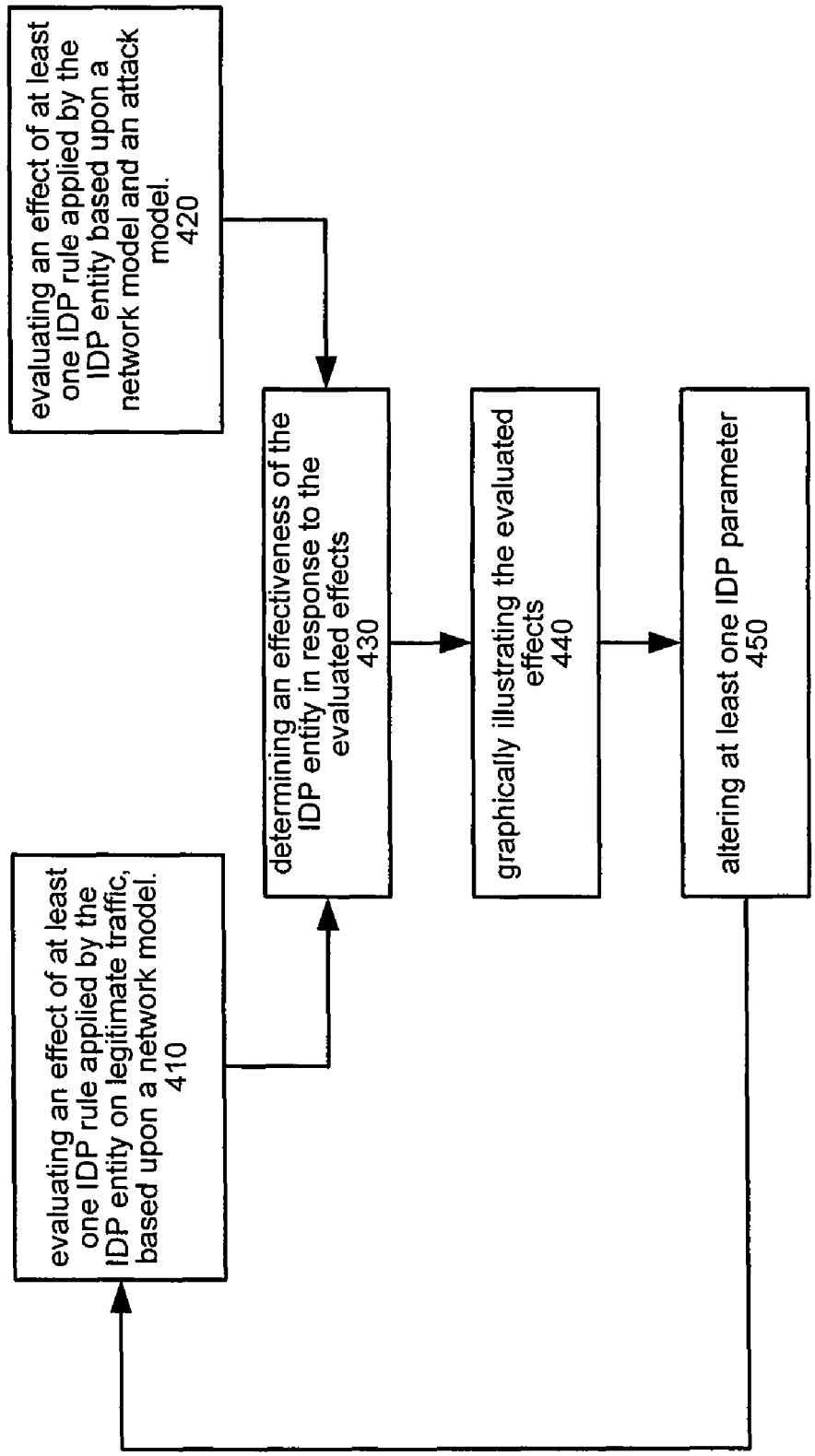
FIG. 7 illustrates a method for evaluating an IDP entity, according to an embodiment of the invention.

FIG. 7 illustrates method 400 for evaluating an IDP entity, according to an embodiment of the invention.

Method 400 includes step 410 of evaluating an effect of at least one IDP rule applied by the IDP entity on legitimate traffic, based upon a network model. Step 410 can be followed by step 420 of evaluating an effect of at least one IDP rule applied by the IDP entity based upon a network model and an attack model.

Step 420 is followed by step 430 of determining an effectiveness of the IDP entity in response to the evaluated effects.

Step 430 is followed by optional step 440 of graphically illustrating the evaluated effects.

Conveniently, step 420 includes determining access and IDP information representative of possible communication paths through the network and of IDP rules applied during the possible communication paths.

Step 440 can be followed by step 450 of altering at least one IDP parameter and jumping to step 410. Repetitions of steps 410-450 can provide an indication about preferred IDP parameters.

Conveniently, the attack model can be filtered so that method 10 can evaluate the effectiveness of one or more IDP entities in a certain situation. For example, the user can specify a security problem to be resolved. The specification includes the source, the target, and optionally, specific attacking actions. (referring to network 300, the security problem might be the attack of host h2 330 by exploiting vulnerability v2). Thus the attack model can be modified (or rather filtered) to include only this attack. Method 10 can be applied to find a solution to this problem. The solution can include the location of an IDP entity, the applied IDP rules and the like. This can be achieved by altering IDP parameters until the problem is solved. This alteration can include adding one or more IDP entities. It is noted that the process can also be performed for setting the location and configuration of a new IDP device in the network.

Conveniently this may include finding the IDP entities that are located such that the communication from the source to the target necessarily passed through them. If such IDP entities are found, the IDP rules which are supported by these devices are examined to find rules which can prevent the attacking action. A proposed IDP parameter change is reported with the details of the IDP entity and the rule to be invoked. The report might include information on false positive and false negative rates of the rule, and the details of the attacking action the rule is supposed to prevent.

Referring to FIG. 1, the communication necessarily passes through IPS1 320 and FW1 322. The examination of the signatures supported by these devices identifies that, for example, signature 23 of IPS1 320 addresses vulnerability v2. The report suggests adding a rule that apply this signature to the communication that passes through device.

Figure 6:
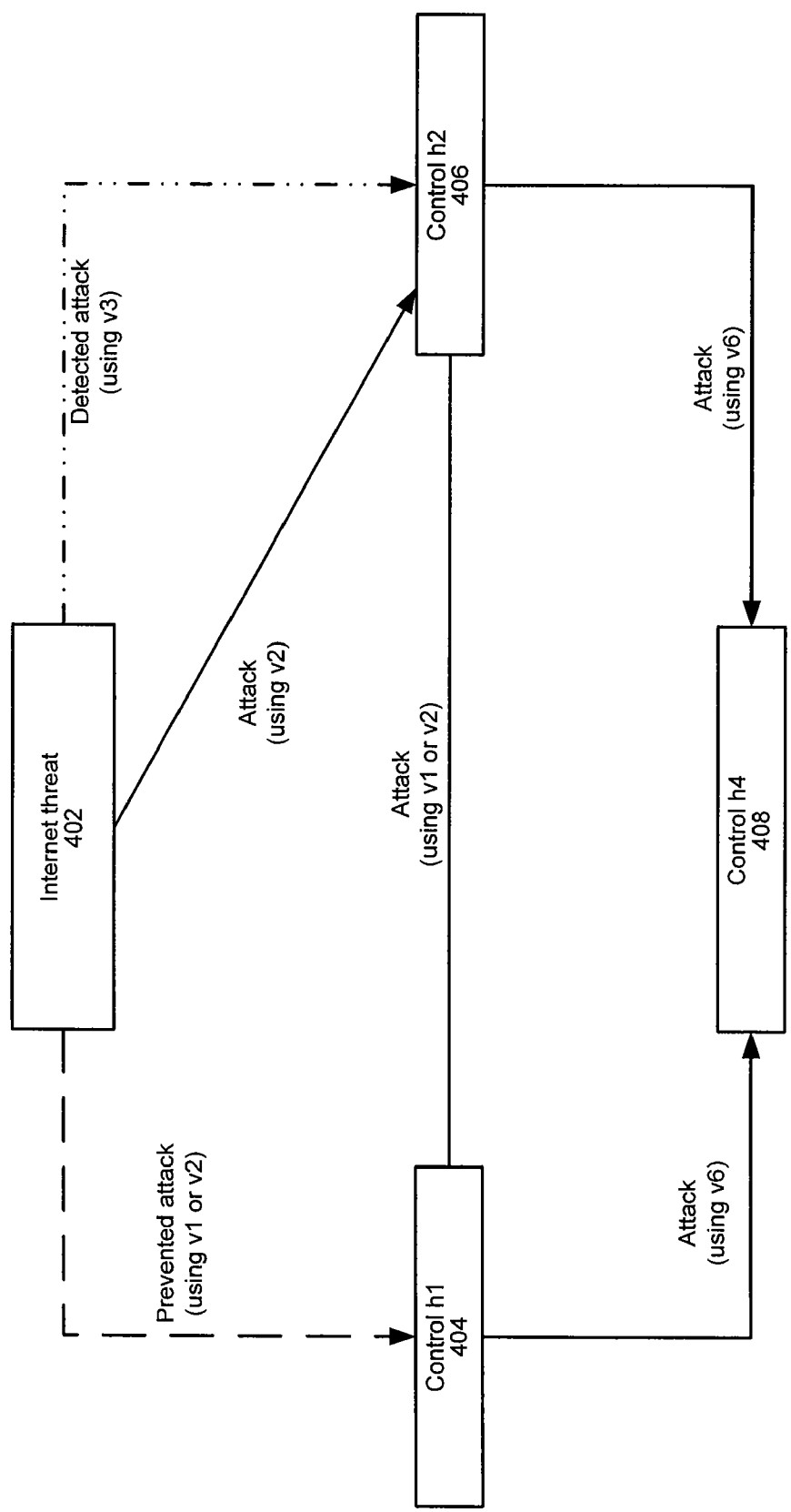
FIG. 6 illustrates an exemplary graph illustrating a result of an attack, according to an embodiment of the invention.

FIG. 6 is a graph 400 of an attack attempt, according to an embodiment of the invention.

Graph 400 includes four nodes—node 402 "internet threat", node 404 "control h1", node 406 "control h2" and node 408—"control h4". Each node illustrates a possible state of a network node (or of a service of a network node). These states can happen if an attack succeeds. Graph 400 illustrates states that are not prevented by an IDP entity as well as states that should have occurred unless the IDP entity prevented them. The edges that connect between nodes illustrated whether the transition from one state to another was allowed (for example the transition from node 402 to node 406 using vulnerability v2), merely detected (the transition from state 402 to 406 using vulnerability v3) or being prevented (the transition from state 402 to 404 using vulnerability v1 or v2).

Figure 5:
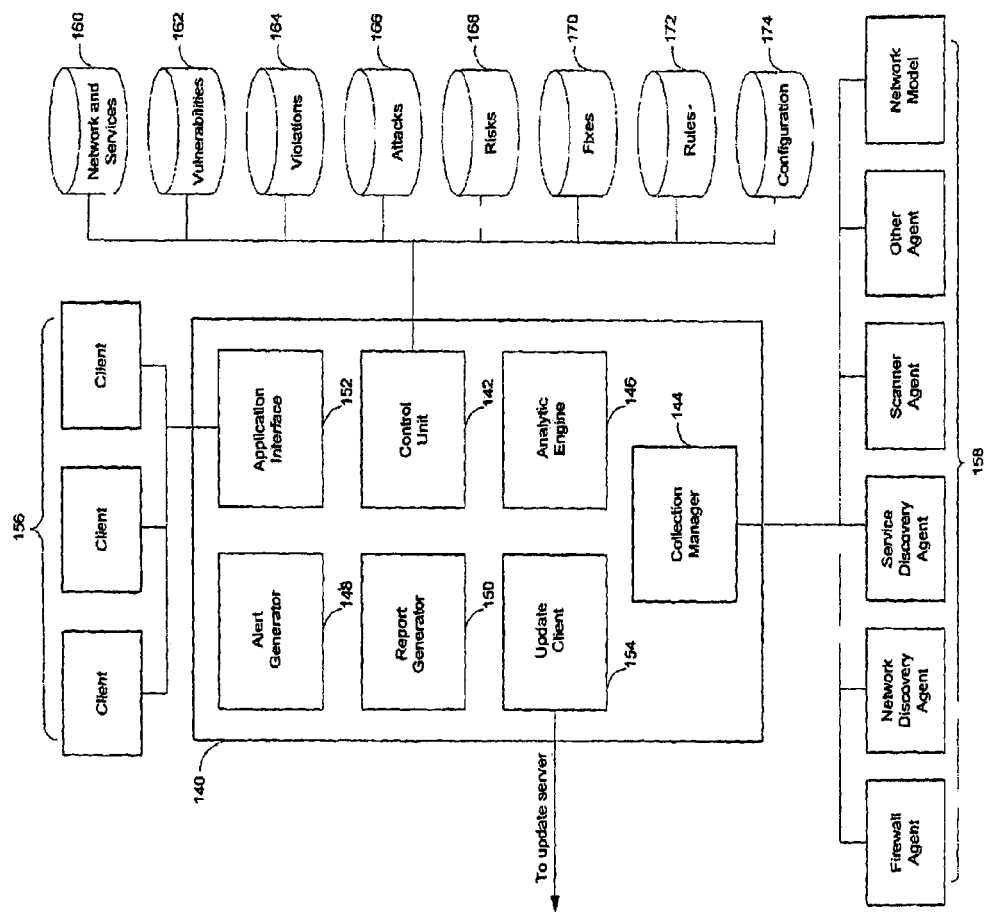
FIG. 5 is a block diagram depicting components of a system in accordance with one embodiment of the present invention.

FIG. 5 is a block diagram depicting components of system 111 in accordance with one embodiment of the present invention.

System 111 includes a server computer 140 includes server software, includes a control device module 142, a collection manager module 144, an analytic engine module 146, an alert generator module 148, a report generator module 150, an application interface module 152, and an update client module 154. The system also includes a client computer 156, comprising client software, and includes one or more information discovery agents 158, a network and services database 160, a vulnerabilities database 162, a violations database 164, an attacks database 166, a risks database 168, a fixes database 170, a rules database 172, and a configuration database 174. It is to be understood that, while, in the embodiment depicted, the server software and the client software are located at the server computer 141 and client computer 156, respectively, in other embodiments, the server software and the client software can be located at or executed from other computers or locations.

The control unit 142 coordinates communications between the other modules of the system. The control device 142 also manages and directs the other modules in the system in performing their respective functions. For example, the control device 142 activates scheduled tasks including data collection by the collection manager 144 data processing by the analytic engine 146, reporting by the reports generator 150, alerts by the alert generator 148, and updates by the update client 154. The control device 142 also serves as the interface to and directs data flow from the network and services database 160, the vulnerabilities database 162, the violations database 164, the attacks database 166, the risks database 168, the fixes database 170, the rules database 172, and the configuration database 174.

The collection manager 144 is responsible for coordinating network data collection performed by the discovery agents 158. The control manager 144 activates the agents, distils information received by the agents according to rules stored in the rules database 172 and the configuration database 174, and updates the network and services database 160 with changes and information received from the discovery agents 158.

The discovery agents 158 collect network information regarding raw vulnerabilities, topology, services (including IDP rules applied by one or more IDP entity), and other information. Exemplary discovery agents 158 include firewall agents, network topology agents, service agents, raw vulnerability scanner agents, and other agents. Specialized agents collect specific information from specific network nodes. For example, firewall agents collect access control lists and filtering rule sets; network topology agents collect information about interconnections between network devices and hosts; network service agents collect lists of services operating on network hosts and devices; and raw vulnerabilities agents collect information regarding vulnerabilities as previously described herein. In some embodiments, the network topology, services, and vulnerability information may alternatively be provided in whole or in part by XML data or other data as specified by a user. The discovery agents 158 can coexist with other of the discovery agents 158, or with the server software or client software on the same host. Discovery agents 158 operate according to scheduled frequencies as specified by the user and stored in the configuration database 174. In some embodiments, discovery agents 158 operate continuously. Alternatively, discovery agents 158 operate on demand when specified by a user, or activated by the collection manager 144, or otherwise event-driven.

The analytic engine 146 performs the actual analysis on the data collected by the discovery agents 158, vulnerabilities stored in the vulnerabilities database 162, and rules stored in the rules database 172. The analytic engine 146 contains a software functions which evaluates the effectiveness of one or more IDP entity, calculate vulnerabilities, determine potential start and end points for attack routes, perform attack simulation, generate lists of possible attacks, calculate consequences of possible attacks, determine probabilities associated with possible attacks, rank actual vulnerabilities, present fixes (including the addition or removal of one or more IDP entity, and adjustment of IDP rules) and perform other analytic actions as further described herein. The analytic engine 146 operates according to scheduled frequencies as specified by the user and stored in the configuration database 174. In some embodiments, the analytic engine 146 operates continuously. Alternatively, the analytic engine 146 operates on demand when specified by a user or directed by the control device 142, or can be otherwise event-driven. Conveniently, the analytic engine can evaluate the effectiveness of a IDP entity by comparing the affect of possible attacks on a first network that includes the evaluated IDP entity to the effect of possible attacks on a second network that differs from the first network by not having the evaluated IDP unit. Conveniently, the analytic engine 146 is adapted to evaluate the effectiveness of IDP rules by adjusting the rules and assessing the affect of possible attacks.

The alert generator 148 issues alerts according to vulnerabilities, risks, or violations detected as specified by preferences stored in the configuration database 174. For example, the alert generator 148 issues alerts that may lead to immediate action items such as extremely high risk vulnerabilities. The alert generator 148 operates according to scheduled frequencies as specified by the user and stored in the configuration database 174. In some embodiments, the alert generator 148 operates continuously. Alternatively, the alert generator 148 operates on demand when specified by a user or directed by the control device 142, or can be otherwise event-driven.

The report generator 150 creates reports of analysis results, system activities, rule sets, and other items as specified by a user. Reports are generated in Rich Text Format, Portable Document Format, and other report formats known in the art. The report generator 150 operates according to scheduled frequencies as specified by the user and stored in the configuration database 174. In some embodiments, the report generator 150 operates continuously as in the case of creating log files of system activities. Alternatively, the report generator 150 operates on demand when specified by a user or directed by the control device 142, or can be otherwise event-driven.

The application interface 152 provides functions that enable the modules of the server software and the client software to communicate with each other. For example, the application interface 152 coordinates communications between the client computers 156 and the control device 142, the collection manager 144, the analytic engine 146, the alert generator 148, the report generator 150, and the update client 154. The application interface 152 also supports a graphical user interface ("GUI") at the client computers 156 or provided through client software, which permits users of the client computers or client software to conduct rules editing, to configure scheduled reports and alerts, to conduct interactive analysis, editing and browsing of the network model, vulnerabilities, and analysis results, to view the state of security of the network, to perform user management, to perform task management, to perform agent management, and to perform other activities in communication with the server software. In some embodiments, the client GUI is color coded according to risks presented by vulnerabilities detected.

The update client 154 is responsible for obtaining updates of the system. System updates are obtained from an update server operated by the assignee of the present application or from other servers as specified by the user or stored in the configuration database 174. Update information includes updates of the vulnerabilities rule set, updates of the system software and modules, updates of the discovery agents 158, updates regarding vulnerability fixes, and other information useful in the operation of the system. The update client 154 operates according to scheduled frequencies as specified by the user and stored in the configuration database 174. In some embodiments, the update client 154 operates continuously checking for new updates or information. Alternatively, the update client 154 operates on demand when specified by a user or directed by the control device 142. In some embodiments, the update client 154 operates upon receipt of a signed email or other instruction from the update server.

The server computer 141 is communicatively coupled to a number of databases 160-174 which store data used by the system to detect and analyze risks in a computer network. In some embodiments, two or more of the databases 160-174 can be combined into a single database. The network and services database 160 stores information regarding the network topology and network services, which can include service configuration information. The network and services database 160 can store the IDP signatures.

The vulnerabilities database 162 stores information regarding vulnerabilities including raw vulnerabilities collected by the network discovery agents 158 and the vulnerabilities rule set used to add logic to raw vulnerabilities.

The violations database 164 can store policy violations detected by the system, alerts generated and their status, and reports generated, or, in some embodiments, information such as the alert information and the report information can be stored in one or more other databases.

The attacks database 166 stores analysis results regarding attacks including attack graphs, attack routes, start points, end points, and other similar information. The risks database 168 stores probability data regarding the likelihood of possible attacks occurring, and can store potential damage data associated with each of several attack scenarios.

The fixes database 170 stores information regarding how to eliminate and fix vulnerabilities detected by the system. The rules database 172 stores filtering rules which contain assertions for the existence of assets or vulnerabilities, policy rules regarding permitted access and services, and business rules regarding threats, damages, and dependencies. The configuration database 174 stores information regarding users, system security, agent preferences, task scheduling, alerts and reports configuration, and other configuration information used by the system.

In some embodiments, the data stored in the network and services database 160, the vulnerabilities database 162, the violations database 164, the attacks database 166, the risks database 168, the fixes database 170, the rules database 172, and the configuration database 174 is stored in a single database. Conveniently, an IDP signature dictionary can be included within another database or within one of the mentioned above databases.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

The invention claimed is:

1. A method for evaluating a security characteristic, the method comprising:
   (a) generating a network model representative of a topology of a network and of vulnerabilities of network nodes;
   (b) generating an attack dictionary representative of attack actions on at least one network node of the network model;

(c) determining access and Intrusion Detection and Prevention (IDP) information representative of communication paths through the network model and of IDP rules applied during the communication paths;

(d) evaluating at least one first result of at least one attack on at least one network node, based on the network model;

(g) evaluating a security characteristic in response to the at least one first result; wherein the security characteristic is at least one out of (i) a location of at least one IDP entity, and (ii) a security level of the network;

receiving legitimate traffic information indicative of required communication between a client and a service;

evaluating an effect of at least one IDP rule applied by the IDP entity on the legitimate traffic, based upon the network model, wherein the evaluating comprises determining if the IDP entity is expected to block legitimate traffic;

determining an effectiveness of the IDP entity in response to the evaluated effects; and graphically illustrating the evaluated effects; and wherein the determining of the effectiveness is responsive to information representing a penalty that is incurred if the legitimate traffic is stopped.

2. The method according to claim 1 further comprising: (e) altering at least one IDP parameter and repeating steps (a)-(c); (f) evaluating at least one second result of at least one attack on at least one network node; and wherein the evaluating of the security characteristic is further responsive to the at least one second result.

3. The method according to claim 1 wherein the security characteristic is the location of the at least one IDP entity.

4. The method according to claim 1 wherein the security characteristic is a IDP rule applied by at least one IDP entity.

5. The method according to claim 1 further comprising graphically illustrating attacks.

6. The method according to claim 1 further comprising determining the effect of one or more IDP entities on legitimate traffic.

7. The method according to claim 1 wherein the security characteristic is the security level of the network.

8. The method according to claim 1 wherein the evaluating comprises determining a possibility to perform attack actions between nodes in the network.

9. A method for evaluating an Intrusion Detection and Prevention (IDP) entity, the method comprises:

receiving legitimate traffic information indicative of required communication between a client and a service;

generating a network model representative of a topology of a network and of vulnerabilities of network nodes;

evaluating an effect of at least one IDP rule applied by the IDP entity on the legitimate traffic, based upon the network model, wherein the evaluating comprises determining if the IDP entity blocked legitimate traffic;

generating an attack dictionary representative of attack actions on at least one network node of the network model;

determining access and IDP information representative of communication paths through the network and of IDP rules applied during the communication paths;

evaluating at least one first result of at least one attack on at least one network node, based on the network model;

evaluating an effect of at least one IDP rule applied by the IDP entity based upon the network model and an attack model;

determining an effectiveness of the IDP entity in response to the evaluated effects; and graphically illustrating the evaluated effects; and wherein the determining of the effectiveness is responsive to information representing a penalty that is incurred if the legitimate traffic is stopped.

10. The method according to claim 9 further comprising determining access and IDP information representative of communication paths through the network and of IDP rules applied during the communication paths.

11. The method according to claim 9 further comprising altering at least one IDP parameter and repeating the steps of evaluating and the step of determining.

12. A method comprising:

receiving legitimate traffic information indicative of required communication between a client and a service;

evaluating an effect of at least one Intrusion Detection and Prevention (IDP) rule applied by the IDP entity on the legitimate traffic, based upon the network model, wherein the evaluating comprises determining if the IDP entity is expected to block legitimate traffic;

determining an effectiveness of the IDP entity in response to the evaluated effects; and performing access and IDP analysis, based on a network model representative of a topology of a network and of vulnerabilities of network nodes, such as to identify remote services that can be accessed from at least one source of the network model; wherein the performing comprises generating access information that represents sets of packets that can reach a network node from source nodes independently of a particular communication pattern or attacking action;

examining, based on the network model, for the identified remote services, related attacking actions that belong to a selected group of attack actions;

identifying the IDP rules which are applied to packets that are represented by the access information and can reach the identified remote services; and graphically illustrating the evaluated effects; and wherein the determining of the effectiveness is responsive to information representing a penalty that is incurred if the legitimate traffic is stopped.

13. The method according to claim 12 wherein the performing comprises receiving as a network model, sources and targets; and scanning the network, starting from source nodes to determine which packets can reach the network nodes, in response to access rules and in response to IDP rules.

14. A computer program product comprising a non-transitory computer usable medium including a computer readable program, wherein the computer readable program when executed on a computer causes the computer to (a) generate a network model representative of a topology of a network and of vulnerabilities of network nodes;

(b) generate an attack dictionary representative of attack actions on at least one network node of the network model;

(c) determine access and Intrusion Detection and Prevention LIDP1 information representative of communication paths through the network and of IDP rules applied during the communication paths;

(d) evaluate at least one first result of at least one attack on at least one network node, based on the network model;

(g) evaluate a security characteristic in response to the at least one first result wherein the security characteristic is at least one out of (i) a location of at least one IDP entity, and (ii) a security level of the network;

receive legitimate traffic information indicative of required communication between a client and a service;

evaluate an effect of at least one IDP rule applied by the IDP entity on the legitimate traffic, based upon the network model, wherein the evaluate an effect comprises determining if the IDP entity is expected to block legitimate traffic;

determine an effectiveness of the IDP entity in response to the evaluated effects; and graphically illustrate the evaluated effects; and wherein the determining of the effectiveness is responsive to information representing a penalty that is incurred if the legitimate traffic is stopped.

15. The computer program product according to claim 14, wherein the computer readable program when executed on a computer causes the computer to: (e) alter at least one IDP parameter and repeat (a)-(c); evaluate at least one second result of at least one attack on at least one network node; and (g) evaluate a security characteristic in response to the at least one first result and the at least one second result.

16. The computer program product according to claim 14, wherein the security characteristic is the location of at least one IDP entity.

17. The computer program product according to claim 14, wherein the security characteristic is a IDP rule applied by at least one IDP entity.

18. The computer program product according to claim 14, wherein the computer readable program when executed on a computer causes the computer to graphically illustrate attacks.

19. The computer program product according to claim 14, wherein the computer readable program when executed on a computer causes the computer to determine the effect of one or more IDP entities on legitimate traffic.

20. The computer program product according to claim 14, wherein the security characteristic is the security level of the network.

21. The computer program product according to claim 14, wherein the computer readable program when executed on a computer causes the computer to determine a possibility to perform attack actions between nodes in the network.

22. A computer program product comprising a non-transitory computer usable medium including a computer readable program, wherein the computer readable program when executed on a computer causes the computer to receive legitimate traffic information indicative of required communication between a client and a service; generate a network model representative of a topology of a network and of vulnerabilities of network nodes; evaluate an effect of at least one Intrusion Detection and Prevention (IDP) rule applied by the IDP entity on legitimate traffic, based upon the network model wherein an evaluation of the effect comprises determining if the IDP entity blocked legitimate traffic;

generate an attack dictionary representative of attack actions on at least one network node of the network model;

determine access and IDP information representative of communication paths through the network and of IDP rules applied during the communication paths;

evaluate at least one first result of at least one attack on at least one network node, based on the network model;

evaluate an effect of at least one IDP rule applied by the IDP entity based upon a network model and an attack model;

determine an effectiveness of the IDP entity in response to the evaluated effects; and graphically illustrate the evaluated effects; and wherein the determining of the effectiveness is responsive to information representing a penalty that is incurred if the legitimate traffic is stopped.

23. The computer program product according to claim 22, wherein the computer readable program when executed on a computer causes the computer to determine access and IDP information representative of communication paths through the network and of IDP rules applied during the communication paths.

24. The computer program product according to claim 22, wherein the computer readable program when executed on a computer causes the computer to alter at least one IDP parameter and repeating the steps of evaluating and the step of determining.

25. A computer program product comprising a non-transitory computer usable medium including a computer readable program, wherein the computer readable program when executed on a computer causes the computer to perform access and Intrusion Detection and Prevention (IDP) analysis, based on a network model representative of a topology of a network and of vulnerabilities of network nodes, such as to identify remote services that can be accessed from at least one source of the network model; wherein the access and IDP analysis comprises generating access information that represents sets of packets that can reach a network node from source nodes independently of a particular communication pattern or attacking action;

examine, for the identified remote services, related attacking actions that belong to a selected group of attack actions identify the IDP rules which are applied to packets that are represented by the access information and can reach the identified remote services; receive legitimate traffic information indicative of required communication between a client and a service; evaluate an effect of at least one IDP rule applied by the IDP entity on the legitimate traffic, based upon the network model, wherein the evaluate an effect comprises determining if the IDP entity blocked legitimate traffic; determine an effectiveness of the IDP entity in response to the evaluated effects; and graphically illustrate the evaluated effects; and wherein the determining of the effectiveness is responsive to information representing a penalty that is incurred if the legitimate traffic is stopped.

26. The computer program product according to claim 25, wherein the computer readable program when executed on a computer causes the computer to receive as a network model, sources and targets; and scan the network, starting from source nodes to determine which packets can reach the network nodes, in response to access rules and in response to IDP rules.

27. A system for evaluating a security characteristic, the system comprises:

at least one data base adapted to store a network model representative of a topology of a network and of vulnerabilities of network nodes, an attack dictionary representative of attack actions on at least one node of the network model; and a server computer that comprises a server software that comprises at least one module adapted to:

determine access and Intrusion Detection and Prevention (IDP) information representative of communication paths through the network model and of IDP rules applied during the communication paths;

evaluate at least one first result of at least one attack on at least one network node; and evaluate a security characteristic in response to the at least one first result;

wherein the security characteristic is at least one out of (i) a location of at least one IDP entity, and (ii) a security level of the network;

receive legitimate traffic information indicative of required communication between a client and a service;

evaluate an effect of at least one IDP rule applied by the IDP entity on the legitimate traffic, based upon the network model, wherein the evaluate an effect comprises determining if the IDP entity blocked legitimate traffic;

determine an effectiveness of the IDP entity in response to the evaluated effects; and graphically illustrate the evaluated effects; and wherein the determining of the effectiveness is responsive to information representing a penalty that is incurred if the legitimate traffic is stopped.

28. The system according to claim 27 further adapted to alter at least one IDP parameter and repeat a sequence of a generation or an update of the network model and of the attack dictionary and a determination of access and IDP information representative of communication paths through the network and of IDP rules applied during the communication paths; and wherein the system is adapted to evaluate a security characteristic in response to the at least one first result and to at least one second result.

29. The system according to claim 28 wherein the security characteristic is the location of at least one IDP entity.

30. The system according to claim 28 wherein the security characteristic is a IDP rule applied by at least one IDP entity.

31. The system according to claim 28 further adapted to graphically illustrate attacks.

32. The system according to claim 28 further adapted to determine the effect of one or more IDP entities on legitimate traffic.

33. The system according to claim 28 wherein the security characteristic is the security level of the network.

34. The system according to claim 28 further adapted to determine a possibility to perform attack actions between nodes in the network.

35. A system for evaluating an Intrusion Detection and Prevention (IDP) entity, the system comprises:
- at least one data base adapted to store a network model representative of a topology of a network and of vulnerabilities of network nodes; and
- a server computer that comprises a server software that comprises at least one module adapted to:
- generate an attack dictionary representative of attack actions on at least one network node of the network model;
- determine access and IDP information representative of communication paths through the network and of IDP rules applied during the communication paths;
- evaluate at least one first result of at least one attack on at least one network node, based on the network model;
- receive legitimate traffic information indicative of required communication between a client and a service;
- evaluate an effect of at least one IDP rule applied by the IDP entity on legitimate traffic, based upon the network model; wherein an evaluation of the effect of the at least one IDP rule comprises determining if the IDP entity blocked legitimate traffic;
- evaluate an effect of at least one IDP rule applied by the IDP entity based upon a network model and an attack model;
- determine an effectiveness of the IDP entity in response to the evaluated effects; and
- graphically illustrate the evaluated effects; and wherein the determining of the effectiveness is responsive to information representing a penalty that is incurred if the legitimate traffic is stopped.

36. The system according to claim 35 further adapted to graphically illustrate the evaluated effects.

37. The system according to claim 35 further adapted to determine access and IDP information representative of communication paths through the network and of IDP rules applied during the communication paths.

38. The system according to claim 35 further adapted to alter at least one IDP parameter and repeat the evaluation and the determination.

39. A system comprising a server computer that comprises a server software that comprises at least one module adapted to receive as a network model, source nodes and target nodes; perform access and Intrusion Detection and Prevention (IDP) analysis such as to identify remote services of the target nodes that can be accessed from at least one source node; wherein the access and IDP analysis comprises generating access information that represents sets of packets that can reach a network node from source nodes independently of a particular communication pattern or attacking action; examine, for the identified remote services, related attacking actions that belong to a selected group of attack actions and identify the IDP rules which are applied to packets that can reach the identified remote services;
- receive legitimate traffic information indicative of required communication between a client and a service;
- evaluate an effect of at least one IDP rule applied by the IDP entity on the legitimate traffic, based upon the network model, wherein the evaluate an effect comprises determining if the IDP entity blocked legitimate traffic;
- determine an effectiveness of the IDP entity in response to the evaluated effects; and
- graphically illustrate the evaluated effects; and wherein the determining of the effectiveness is responsive to information representing a penalty that is incurred if the legitimate traffic is stopped.

40. The system according to claim 39 wherein the system is adapted to scan the network model, starting from source nodes to determine which packets can reach the target nodes, in response to access rules and in response to IDP rules.

* * * * *